(12) United States Patent
Feng et al.

(10) Patent No.: US 11,323,200 B2
(45) Date of Patent: May 3, 2022

(54) METHOD OF ALLOCATING RADIO RESOURCE AND DEVICE UTILIZING THE SAME

(71) Applicant: GUANGDONG OPPO MOBILE TELECOMMUNICATIONS CORP., LTD., Guangdong (CN)

(72) Inventors: Bin Feng, Dongguan (CN); Hai Tang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 67 days.

(21) Appl. No.: 15/766,204

(22) PCT Filed: Nov. 13, 2015

(86) PCT No.: PCT/CN2015/094616
§ 371 (c)(1),
(2) Date: Apr. 5, 2018

(87) PCT Pub. No.: WO2017/079982
PCT Pub. Date: May 18, 2017

(65) Prior Publication Data
US 2019/0123848 A1    Apr. 25, 2019

(51) Int. Cl.
*H04L 1/00* (2006.01)
*H04W 72/04* (2009.01)
(Continued)

(52) U.S. Cl.
CPC .......... *H04L 1/0003* (2013.01); *H04L 1/1812* (2013.01); *H04L 5/0053* (2013.01);
(Continued)

(58) Field of Classification Search
CPC ... H04L 5/0053; H04L 5/0094; H04L 1/0003; H04L 1/1812; H04W 72/042;
(Continued)

(56) References Cited

U.S. PATENT DOCUMENTS 9,288,249 B1 * 3/2016 Chang .................. H04N 21/858
9,345,013 B2 * 5/2016 Seo ...................... H04W 72/042
(Continued)

FOREIGN PATENT DOCUMENTS

CN    101489305 A    7/2009
CN    101291512 B    5/2012
(Continued)

OTHER PUBLICATIONS

Supplementary European Search (Report in the European application No. 15908112.4, dated Feb. 5, 2019.
(Continued)

*Primary Examiner* — Dung B Huynh
(74) *Attorney, Agent, or Firm* — Ladas & Parry, LLP (57) ABSTRACT

The embodiments of the invention relate to a method of allocating a radio resource and a device utilizing the same. The method comprises: a transmitter determines, according to an identification (ID) of a receiver at a present state, and based on a redefined rule, a channel time-frequency location where a control channel associated with the present state of the receiver is; and the transmitter transmits, via the control channel at the channel time-frequency location, and to the receiver, data time-frequency location indication information, a size of time-frequency resource occupied by data, and a data modulation and coding scheme. In the method of allocating the radio resource and the device utilizing the same according to the embodiments of the invention, the transmitter determines, according to the ID of the receiver at the present state, the time-frequency location where the (Continued)

control channel associated with the present state of the receiver is, and indicates, via the control channel, and to the receiver, the time-frequency location for transmitting data, flexibly allocating control channels for use by a transmitter and receiver by actual requirements, increasing efficiency, performance, and adaptability of a wireless communication system.

12 Claims, 3 Drawing Sheets

(51) Int. Cl.
  *H04L 5/00* (2006.01)
  *H04W 76/11* (2018.01)
  *H04L 1/18* (2006.01)
  *H04W 72/12* (2009.01)
  *H04J 13/00* (2011.01)

(52) U.S. Cl.
  CPC ......... *H04L 5/0094* (2013.01); *H04W 72/042* (2013.01); *H04W 76/11* (2018.02); *H04J 13/00* (2013.01); *H04W 72/0446* (2013.01); *H04W 72/0453* (2013.01); *H04W 72/1289* (2013.01)

(58) Field of Classification Search
  CPC ......... H04W 72/0446; H04W 72/0453; H04W 72/1289; H04W 76/11; H04W 72/04–10; H04J 13/00
  See application file for complete search history.

(56) References Cited

U.S. PATENT DOCUMENTS

| | | | | |
|---|---|---|---|---|
| 2007/0010268 A1* | 1/2007 | Kim | H04L 1/0003 | 455/509 |
| 2007/0230350 A1* | 10/2007 | Heo | H04W 72/1289 | 370/235 |
| 2008/0273513 A1* | 11/2008 | Montojo | H04W 72/1273 | 370/342 |
| 2008/0310362 A1* | 12/2008 | McBeath | H04L 5/0073 | 370/330 |
| 2008/0310386 A1* | 12/2008 | Venkatachalam | G01S 5/0215 | 370/345 |
| 2009/0124290 A1* | 5/2009 | Tao | H04B 7/0874 | 455/562.1 |
| 2009/0196261 A1 | 8/2009 | Sambhwani | | |
| 2009/0207785 A1* | 8/2009 | Smith | H04W 72/04 | 370/328 |
| 2009/0232084 A1* | 9/2009 | Li | H04L 5/0007 | 370/330 |
| 2009/0268645 A1* | 10/2009 | Chindapol | H04L 5/14 | 370/281 |
| 2010/0046451 A1* | 2/2010 | Tada | H04W 72/04 | 370/329 |
| 2010/0248750 A1* | 9/2010 | Muller | H04W 68/02 | 455/458 |
| 2010/0255851 A1* | 10/2010 | Kwak | H04L 5/0044 | 455/450 |
| 2010/0255859 A1* | 10/2010 | Park | H04W 68/025 | 455/458 |
| 2010/0272074 A1* | 10/2010 | Cheng | H04B 17/336 | 370/336 |
| 2010/0330989 A1* | 12/2010 | Song | H04W 48/16 | 455/434 |
| 2011/0038327 A1* | 2/2011 | Moon | H04L 5/0044 | 370/329 |
| 2011/0070845 A1* | 3/2011 | Chen | H04W 72/042 | 455/91 |
| 2011/0092243 A1* | 4/2011 | Tee | H04L 5/0053 | 455/513 |
| 2011/0110315 A1* | 5/2011 | Chen | H04L 5/0053 | 370/329 |
| 2011/0110316 A1* | 5/2011 | Chen | H04W 72/042 | 370/329 |
| 2011/0116454 A1* | 5/2011 | Chen | H04W 72/042 | 370/329 |
| 2011/0182200 A1* | 7/2011 | Wan | H04W 72/042 | 370/252 |
| 2011/0200000 A1* | 8/2011 | Nishio | H04L 5/0055 | 370/329 |
| 2011/0200004 A1* | 8/2011 | Nakashima | H04L 5/0053 | 370/330 |
| 2011/0243066 A1* | 10/2011 | Nayeb Nazar | H04L 5/0048 | 370/328 |
| 2011/0243088 A1* | 10/2011 | Ahn | H04L 1/0091 | 370/329 |
| 2011/0267957 A1* | 11/2011 | Du | H04L 5/0053 | 370/241 |
| 2011/0269492 A1* | 11/2011 | Wang | H04L 5/003 | 455/509 |
| 2011/0273996 A1* | 11/2011 | Kim | H04L 5/0091 | 370/242 |
| 2011/0280203 A1* | 11/2011 | Han | H04L 5/0007 | 370/329 |
| 2011/0286397 A1* | 11/2011 | Kim | H04L 5/003 | 370/328 |
| 2011/0299489 A1* | 12/2011 | Kim | H04L 1/0061 | 370/329 |
| 2011/0306383 A1* | 12/2011 | Lee | H04W 72/02 | 455/522 |
| 2012/0033627 A1* | 2/2012 | Li | H04L 5/0053 | 370/329 |
| 2012/0044821 A1* | 2/2012 | Kim | H04L 5/0094 | 370/252 |
| 2012/0063384 A1* | 3/2012 | Bi | H04B 7/15557 | 370/315 |
| 2012/0093104 A1* | 4/2012 | Tiirola | H04L 5/0053 | 370/329 |
| 2012/0127946 A1* | 5/2012 | Nishio | H04L 1/0038 | 370/329 |
| 2012/0230278 A1* | 9/2012 | Sato | H04W 72/042 | 370/329 |
| 2012/0243498 A1* | 9/2012 | Kwon | H04L 5/00 | 370/329 |
| 2012/0250641 A1* | 10/2012 | Sartori | H04W 48/12 | 370/329 |
| 2012/0287877 A1* | 11/2012 | Han | H04W 52/0216 | 370/329 |
| 2012/0327904 A1* | 12/2012 | Park | H04L 5/0007 | 370/331 |
| 2013/0039284 A1* | 2/2013 | Marinier | H04L 5/001 | 370/329 |
| 2013/0039291 A1 | 2/2013 | Blankenship | | |
| 2013/0039334 A1* | 2/2013 | Han | H04L 5/0007 | 370/330 |
| 2013/0064216 A1* | 3/2013 | Gao | H04L 5/0053 | 370/330 |
| 2013/0070722 A1* | 3/2013 | Li | H04L 5/0003 | 370/329 |
| 2013/0107816 A1* | 5/2013 | Iraji | H04W 72/042 | 370/329 |
| 2013/0107861 A1* | 5/2013 | Cheng | H04W 72/042 | 370/331 |
| 2013/0150060 A1* | 6/2013 | Abe | H04W 72/082 | 455/450 |
| 2013/0155872 A1* | 6/2013 | Subramanian | H04W 24/06 | 370/242 |
| 2013/0163532 A1 | 6/2013 | Anderson et al. | | |
| 2013/0188592 A1 | 7/2013 | Yang | | |
| 2013/0223331 A1* | 8/2013 | Chun | H04W 72/04 | 370/315 |
| 2013/0229989 A1* | 9/2013 | Natarajan | H04L 5/0048 | 370/329 |
| 2014/0003349 A1* | 1/2014 | Kang | H04L 5/0053 | 370/328 |

(56) References Cited

U.S. PATENT DOCUMENTS

| | | | |
|---|---|---|---|
| 2014/0044085 A1* | 2/2014 | Hong | H04L 5/0037 370/329 |
| 2014/0105191 A1* | 4/2014 | Yang | H04L 1/1867 370/336 |
| 2014/0112303 A1* | 4/2014 | Popovic | H04L 5/0044 370/330 |
| 2014/0126525 A1* | 5/2014 | Shen | H04W 72/0413 370/329 |
| 2014/0146720 A1 | 5/2014 | Tang et al. | |
| 2014/0146765 A1* | 5/2014 | Ji | H04W 72/082 370/329 |
| 2014/0185530 A1* | 7/2014 | Kuchibhotla | H04W 76/14 370/329 |
| 2014/0185714 A1* | 7/2014 | Seyama | H04L 25/0204 375/340 |
| 2014/0198685 A1* | 7/2014 | Xu | H04W 48/16 370/254 |
| 2014/0198747 A1* | 7/2014 | Ouchi | H04L 5/0053 370/329 |
| 2014/0233537 A1* | 8/2014 | Wu | H04W 72/042 370/336 |
| 2014/0286267 A1* | 9/2014 | Hui | H04L 1/0019 370/329 |
| 2014/0286292 A1* | 9/2014 | Park | H04L 5/0053 370/329 |
| 2014/0307690 A1* | 10/2014 | Kim | H04B 7/2656 370/329 |
| 2014/0321420 A1 | 10/2014 | Nakashima et al. | |
| 2014/0328312 A1* | 11/2014 | Seo | H04L 1/1861 370/329 |
| 2014/0348089 A1* | 11/2014 | Lv | H04W 72/042 370/329 |
| 2014/0348103 A1* | 11/2014 | Kim | H04W 72/042 370/329 |
| 2014/0348110 A1* | 11/2014 | Wang | H04L 1/0041 370/329 |
| 2015/0004901 A1* | 1/2015 | Agiwal | H04W 76/14 455/39 |
| 2015/0029874 A1* | 1/2015 | Davydov | H04W 24/08 370/252 |
| 2015/0043521 A1* | 2/2015 | Park | H04L 1/18 370/330 |
| 2015/0049685 A1* | 2/2015 | Chen | H04L 27/2613 370/329 |
| 2015/0124739 A1* | 5/2015 | Baik | H04W 72/0453 370/329 |
| 2015/0131599 A1* | 5/2015 | Xue | H04W 72/042 370/329 |
| 2015/0146639 A1* | 5/2015 | Seo | H04L 5/0094 370/329 |
| 2015/0181546 A1* | 6/2015 | Freda | H04L 27/0014 370/336 |
| 2015/0195069 A1* | 7/2015 | Yi | H04W 4/70 370/329 |
| 2015/0208390 A1* | 7/2015 | Zhao | H04W 72/042 370/330 |
| 2015/0208391 A1* | 7/2015 | Park | H04L 5/0094 370/329 |
| 2015/0223254 A1* | 8/2015 | Guo | H04W 72/0493 370/312 |
| 2015/0230210 A1* | 8/2015 | Lee | H04L 5/0007 370/329 |
| 2015/0237624 A1* | 8/2015 | Tang | H04W 48/16 370/329 |
| 2015/0256316 A1 | 9/2015 | Seo et al. | |
| 2015/0257086 A1* | 9/2015 | Jiang | H04W 48/08 370/329 |
| 2015/0257131 A1* | 9/2015 | Wong | H04L 5/001 370/329 |
| 2015/0280875 A1* | 10/2015 | Jing | H04B 7/0684 370/329 |
| 2015/0282165 A1* | 10/2015 | Ni | H04W 68/00 370/329 |
| 2015/0296488 A1* | 10/2015 | Shimezawa | H04L 5/0094 370/329 |
| 2015/0304991 A1* | 10/2015 | Chen | H04L 5/0053 370/329 |
| 2015/0304996 A1 | 10/2015 | Yang et al. | |
| 2015/0319021 A1* | 11/2015 | Xue | H04L 5/006 455/511 |
| 2015/0373677 A1 | 12/2015 | Seo et al. | |
| 2016/0143009 A1* | 5/2016 | Zhang | H04W 72/042 370/329 |
| 2016/0165640 A1* | 6/2016 | Yang | H04W 4/70 370/336 |
| 2016/0173247 A1* | 6/2016 | Patel | H04L 5/0044 370/329 |
| 2016/0192348 A1* | 6/2016 | Dai | H04W 72/0413 370/329 |
| 2016/0205713 A1* | 7/2016 | Seo | H04L 5/14 370/280 |
| 2016/0234810 A1* | 8/2016 | Wong | H04W 74/0833 |
| 2016/0248561 A1* | 8/2016 | Davydov | H04W 72/042 |
| 2016/0277065 A1* | 9/2016 | Xie | H04L 5/0051 |
| 2016/0286537 A1* | 9/2016 | Ghosh | H04W 72/042 |
| 2016/0308636 A1* | 10/2016 | Deng | H04W 72/0453 |
| 2016/0323912 A1* | 11/2016 | Nakamura | H04L 1/0026 |
| 2016/0345314 A1* | 11/2016 | Webb | H04L 5/0053 |
| 2016/0374055 A1* | 12/2016 | Morita | H04W 72/042 |
| 2016/0374060 A1* | 12/2016 | Lim | H04W 72/042 |
| 2017/0041829 A1* | 2/2017 | Dai | H04W 28/06 |
| 2017/0111152 A1* | 4/2017 | Blankenship | H04L 5/0051 |
| 2017/0150367 A1* | 5/2017 | Han | H04L 5/0092 |
| 2017/0208592 A1* | 7/2017 | Rico Alvarino | H04L 5/0048 |
| 2017/0265136 A1* | 9/2017 | Elsayed | H04W 52/0229 |
| 2017/0265165 A1* | 9/2017 | Li | H04W 48/14 |
| 2017/0290017 A1* | 10/2017 | Takeda | H04W 72/0453 |
| 2017/0338911 A1* | 11/2017 | You | H04L 1/18 |
| 2018/0035424 A1* | 2/2018 | Sun | H04L 5/0094 |
| 2018/0070377 A1* | 3/2018 | Yu | H04W 72/042 |
| 2018/0077680 A1* | 3/2018 | Tenny | H04W 16/28 |
| 2018/0103419 A1* | 4/2018 | Lee | H04W 48/12 |
| 2018/0176894 A1* | 6/2018 | Tang | H04W 72/048 |
| 2018/0242296 A1* | 8/2018 | Li | H04W 72/0453 |
| 2018/0249439 A1* | 8/2018 | Xu | H04W 68/02 |
| 2018/0255542 A1* | 9/2018 | Seo | H04L 5/0053 |
| 2018/0270007 A1* | 9/2018 | Sandberg | H04L 5/0007 |
| 2019/0166619 A1* | 5/2019 | Takeda | H04B 1/7143 |
| 2019/0200214 A1* | 6/2019 | Liu | H04L 5/0094 |
| 2019/0246378 A1* | 8/2019 | Islam | H04W 72/042 |
| 2019/0357187 A1* | 11/2019 | Sun | H04L 1/18 |
| 2019/0387548 A1* | 12/2019 | Kim | H04W 72/0406 |
| 2020/0036496 A1* | 1/2020 | Ahmadi | H04L 5/0062 |
| 2020/0068544 A1* | 2/2020 | Xue | H04W 72/0413 |
| 2020/0120602 A1* | 4/2020 | Geng | H04W 72/044 |
| 2020/0128541 A1* | 4/2020 | Zhang | H04W 76/27 |
| 2020/0137736 A1* | 4/2020 | Du | H04L 5/0048 |
| 2020/0186312 A1* | 6/2020 | Mochizuki | H04W 72/0413 |
| 2020/0229180 A1* | 7/2020 | Liu | H04W 72/0453 |
| 2020/0383138 A1* | 12/2020 | Cao | H04W 74/008 |
| 2021/0297300 A1* | 9/2021 | Zhang | H04L 1/0045 |

FOREIGN PATENT DOCUMENTS

| | | |
|---|---|---|
| CN | 102761398 A | 10/2012 |
| CN | 103220077 A | 7/2013 |
| CN | 103248450 A | 8/2013 |
| CN | 103516466 A | 1/2014 |
| CN | 104054280 A | 9/2014 |
| CN | 104144502 A | 11/2014 |
| CN | 104735787 A | 6/2015 |
| EP | 3013010 A1 | 4/2016 |
| JP | 2008172357 A | 7/2008 |
| JP | 2011097537 A | 5/2011 |
| JP | 2011517383 A | 6/2011 |
| JP | 2013157699 A | 8/2013 |
| JP | 2015502069 A | 1/2015 |
| WO | 2010050234 A1 | 5/2010 |
| WO | 2012139512 A1 | 10/2012 |

(56) References Cited

FOREIGN PATENT DOCUMENTS

| WO | 2014048509 A1 | 4/2014 |
|----|---------------|--------|
| WO | 2014119939 A1 | 8/2014 |
| WO | 2015010259 A1 | 1/2015 |

OTHER PUBLICATIONS

English Translation of the Written Opinion of the International Search Authority in the international application No. PCT/CN2015/094616, dated Aug. 19, 2016.
International Search Report in international application No. PCT/CN2015/094616, dated Aug. 19, 2016.
The Written Opinion of the International Search Authority in international application No. PCT/CN2015/094616, dated Aug. 19, 2016.
First Office Action of the Australian application No. 2015414651, dated Mar. 17, 2020.
First Office Action of the European application No. 15908112.4, dated Apr. 16, 2020.
First Office Action of the Chinese application No. 201580082623.0, dated Apr. 16, 2020.
Second Office Action of the Chinese application No. 201580082623.0, dated Jul. 27, 2020.
First Office Action of the Indian application No. 201817016928, dated Jun. 25, 2020.
Second Office Action of the Australian application No. 2015414651, dated Aug. 4, 2020.
First Office Action of the Brazilian application No. BR1120180067423, dated Aug. 25, 2020.
"3rd Generation Partnership Project;Technical Specification Group Radio Access Network; Evolved Universal Terrestrial Radio Access (E-UTRA); User Equipment (UE) procedures in idle mode (Release 11)", 3GPP TS 36.304 V11.6.0 (Dec. 2013), http://www.3gpp.org.
First Office Action of the Japanese application No. 2018-515246, dated May 14, 2019.
Second Office Action of the Japanese application No. 2018-515246, dated Aug. 30, 2019.
First Office Action of the Canadian application No. 2997527, dated Jan. 14, 2019.
Second Office Action of the Canadian application No. 2997527, dated Dec. 30, 2019.
Notice of Allowance of the Japanese application No. 2020-000241, dated Feb. 16, 2021.
Second Office Action of the European application No. 15908112.4, dated Apr. 8, 2021.
Third Office Action of the Canadian application No. 2997527, dated Oct. 28, 2020.
Fourth Office Action of the Canadian application No. 2997527, dated Aug. 13, 2021.
Fourth Office Action of the Canadian application No. 2997527, dated Nov. 17, 2021.

* cited by examiner

A receiver determines, under a preset rule, a channel time-frequency location of a control channel related to a current state according to an ID in the current state — S210

The receiver receives data time-frequency location indication information indicating a data time-frequency location of data of the receiver, a size of a time-frequency resource occupied by the data and an MCS of the data from the sender through the control channel at the channel time-frequency location — S220

METHOD OF ALLOCATING RADIO RESOURCE AND DEVICE UTILIZING THE SAME

RELATED APPLICATION

This application is an application under 35 U.S.C. 371 of International Application No. PCT/CN2015/094616 filed on Nov. 13, 2015, the entire contents of which are incorporated herein by reference.

TECHNICAL FIELD

The disclosure relates to the field of communications, and particularly to a method and device for radio resource allocation.

BACKGROUND

The existing wireless communication systems, for example, a Global System for Mobile Communication (GSM), Code Division Multiple Access 2000 (CDMA2000), Wideband Code Division Multiple Access (WCDMA) and Long Term Evolution (LTE), usually adopt a relatively fixed manner to allocate control channels, for example, a downlink control channel and a paging channel, which brings relatively higher system overhead, reduces flexibility in system design and spectrum utilization and makes mutual interference of the control channels between different cells inevitable. Meanwhile, a terminal is usually required to perform a lot of blind detection, so that complexity, power consumption and processing time of the terminal are increased.

In addition, a next-generation wireless communication system (5th Generation (5G)) is expected to support ever-changing application manners, and is required to be efficiently adapted to large-scale changes in indexes of bandwidth, delay, mobility, coverage, communication rate, reliability, energy efficiency, number of users and the like. An existing system is unlikely to meet these requirements.

SUMMARY

The disclosure provides a method and device for radio resource allocation, which may improve efficiency, performance and applicability of a wireless communication system.

On a first aspect, a method for radio resource allocation is provided, which may include that: a sender determines, under a preset rule, a channel time-frequency location of a control channel related to a current state of a receiver according to an Identifier (ID) of the receiver in the current state; and the sender sends data time-frequency location indication information indicating a data time-frequency location of data to be sent to the receiver, a size of a time-frequency resource occupied by the data and a Modulation and Coding Scheme (MCS) of the data to the receiver through the control channel at the channel time-frequency location.

In combination with the first aspect, in an implementation mode of the first aspect, the operation that the sender determines the channel time-frequency location of the control channel related to the current state of the receiver according to the ID of the receiver in the current state may include that: the sender determines, under the preset rule, the channel time-frequency location according to the ID in the current state and cell level information.

In combination with the first aspect and the abovementioned implementation mode thereof, in another implementation mode of the first aspect, the method may further include that: the sender sends the preset rule to the receiver.

In combination with the first aspect and the abovementioned implementation modes thereof, in another implementation mode of the first aspect, the operation that the sender determines, under the preset rule, the time-frequency location of the receiver according to the ID of the receiver in the current state may include that: the sender determines the channel time-frequency location through a hash function or a modular function according to the ID of the receiver in the current state.

In combination with the first aspect and the abovementioned implementation modes thereof, in another implementation mode of the first aspect, the operation that the sender determines, under the preset rule, the channel time-frequency location of the receiver according to the ID of the receiver and may include that: the sender determines a time-frequency location where an index channel of the receiver is located according to the ID of the receiver; and the sender determines the channel time-frequency location of the control channel of the receiver according to a location indicated by the index channel.

In combination with the first aspect and the abovementioned implementation modes thereof, in another implementation mode of the first aspect, when determining that at least two receivers have the same channel time-frequency location, the sender may simultaneously send information in control channels corresponding to the at least two receivers at the same channel time-frequency location in a code division multiplexing manner, or a spatial multiplexing manner or an after-superposition interference cancellation manner.

In combination with the first aspect and the abovementioned implementation modes thereof, in another implementation mode of the first aspect, the channel time-frequency location may include a time offset and frequency offset relative to a time-frequency reference point.

In combination with the first aspect and the abovementioned implementation modes thereof, in another implementation mode of the first aspect, the channel time-frequency location may be a Physical Resource Unit (PRU) location or a Virtual Resource Unit (VRU) location; and the data time-frequency location may be a PRU location or a VRU location.

In combination with the first aspect and the abovementioned implementation modes thereof, in another implementation mode of the first aspect, the method may further include that: the sender sends information related to a Hybrid Automatic Repeat Request (HARQ) for the data to the receiver through the control channel.

On a second aspect, A method for radio resource allocation is provided, which may include that: a receiver determines under a preset rule, a channel time-frequency location of a control channel related to a current state, according to an Identifier (ID) in the current state; and the receiver receives data time-frequency location indication information indicating a data time-frequency location of data of the receiver, a size of a time-frequency resource occupied by the data and a Modulation and Coding Scheme (MCS) of the data from the sender through the control channel at the channel time-frequency location.

In combination with the second aspect, in an implementation mode of the second aspect, the operation that the receiver determines under the preset rule, the channel time-frequency location of the control channel related to the current state according to the ID in the current state may include that: the receiver determines the channel time-frequency location of the control channel according to the ID and cell level information.

In combination with the second aspect and the above-mentioned implementation mode thereof, in another implementation mode of the second aspect, the method may further include that: the receiver receives the preset rule sent by the sender.

In combination with the second aspect and the above-mentioned implementation modes thereof, in another implementation mode of the second aspect, the operation that the receiver determines the channel time-frequency location of the control channel related to the current state according to the ID in the current state and under the preset rule may include that: the receiver determines the channel time-frequency location through a hash function or a modular function according to the ID.

In combination with the second aspect and the above-mentioned implementation modes thereof, in another implementation mode of the second aspect, the operation that the receiver determines under the preset rule, the channel time-frequency location of the control channel according to the ID may include that: the receiver determines under the preset rule, a time-frequency location of an index channel according to the ID; and the receiver determines the channel time-frequency location of the control channel according to a location indicated by the index channel.

In combination with the second aspect and the above-mentioned implementation modes thereof, in another implementation mode of the second aspect, the operation that the receiver receives the data time-frequency location indication information, the size of the time-frequency resource occupied by the data and the MCS of the data from the sender through the control channel at the channel time-frequency location may include that: when the control channel at the channel time-frequency location includes the ID of the receiver, the receiver determines the data time-frequency location indication information, the size of the time-frequency resource occupied by the data and the MCS of the data according to information in the control channel; and when the control channel at the channel time-frequency location does not include the ID of the receiver, the receiver enters a sleep state, until a control channel at a next channel time-frequency location includes the ID of the receiver, the receiver determines the data time-frequency location indication information, size of the time-frequency resource occupied by the data and the MCS of the data sent by the sender according to information in the control channel at the next channel time-frequency location.

In combination with the second aspect and the above-mentioned implementation modes thereof, in another implementation mode of the second aspect, the operation that the receiver determines the data time-frequency location indication information, the size of the time-frequency resource occupied by the data and the MCS of the data sent by the sender according to the information in the control channel when the control channel at the channel time-frequency location includes the ID of the receiver may include that: when the control channel at the channel time-frequency location includes the ID of the receiver and an ID of another receiver, the receiver acquires the information in the control channel corresponding to the receiver, and determines the data time-frequency location indication information, the size of the time-frequency resource occupied by the data and the MCS of the data in a code division multiplexing manner, or a spatial multiplexing manner or an interference cancellation manner.

In combination with the second aspect and the above-mentioned implementation modes thereof, in another implementation mode of the second aspect, the channel time-frequency location may be a PRU location or a VRU location; and the data time-frequency location may be a PRU location or a VRU location.

In combination with the second aspect and the above-mentioned implementation modes thereof, in another implementation mode of the second aspect, when the channel time-frequency location is a VRU location, the receiver may determine a PRU location of the control channel according to a mapping relationship between a VRU and a PRU; and when the data time-frequency location is a VRU location, the receiver may determine a PRU location of the data sent by the sender according to the mapping relationship between the VRU and the PRU.

In combination with the second aspect and the above-mentioned implementation modes thereof, in another implementation mode of the second aspect, the method may further include that: the receiver receives information related to a HARQ for the data sent by the sender through the control channel.

On a third aspect, a device for radio resource allocation is provided, which may be configured to execute the method in the first aspect or any possible implementation mode of the first aspect, the device specifically including units configured to execute the method in the first aspect or any possible implementation mode of the first aspect.

On a fourth aspect, a device for radio resource allocation is provided, which may be configured to execute the method in the second aspect or any possible implementation mode of the second aspect, the device specifically including units configured to execute the method in the second aspect or any possible implementation mode of the second aspect.

On the basis of the abovementioned technical solutions, according to the method and device for radio resource allocation of embodiments of the disclosure, the sender determines the time-frequency location of the control channel related to the current state of the receiver according to the ID of the receiver in the current state, and indicates the channel used by the sender and the receiver may be flexibly allocated as desired, and efficiency, performance and applicability of a wireless communication system are improved.

BRIEF DESCRIPTION OF DRAWINGS

In order to describe the technical solutions of the embodiments of the disclosure more clearly, the drawings required to be used in the embodiments of the disclosure will be simply introduced below. Obviously, the drawings described below are only some embodiments of the disclosure. Other drawings may further be obtained by those skilled in the art according to these drawings without creative work.

DETAILED DESCRIPTION

The technical solutions in the embodiments of the disclosure will be clearly and completely described below in combination with the drawings in the embodiments of the disclosure. Obviously, the described embodiments are not all embodiments but part of embodiments of the disclosure. All other embodiments obtained by those skilled in the art on the basis of the embodiments in the disclosure without creative work shall fall within the scope of protection of the disclosure.

Figure 1:
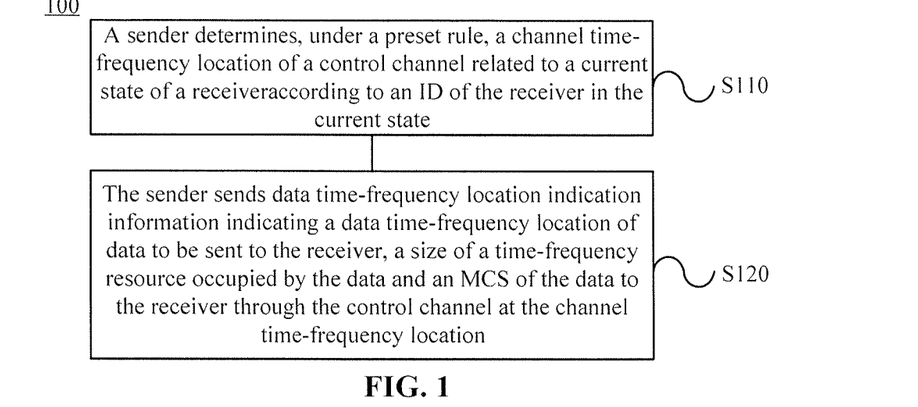
FIG. 1 illustrates a schematic flowchart of a method for radio resource allocation according to embodiments of the disclosure.

FIG. 1 illustrates a schematic flowchart of a method for radio resource allocation 100 according to embodiments of the disclosure. The method 100 may be executed by a sender, and the sender may be a base station; or, for a Device-to-Device (D2D) direct communication scenario, the sender is a sending device among the two terminals. As illustrated in FIG. 1, the method 100 includes the following operations.

In S110, the sender determines, under the preset rule, a channel time-frequency location of a control channel related to a current state of a receiver according to an ID of the receiver in the current state.

In S120, the sender sends data time-frequency location indication information indicating a data time-frequency location of data to be sent to the receiver, a size of a time-frequency resource occupied by data and an MCS of the data to the receiver through the control channel at the channel time-frequency location.

In the embodiments of the disclosure, a wireless communication system does not reserve any dedicated time-frequency resource for non-common downlink control channels, including control channels of downlink resource allocation, paging channels, random access Acknowledgement (ACK), Uplink (UL) resource request ACK (UL_GRANT), HARQ_ACK and uplink power control for certain one or some terminals, the sender may determine the channel time-frequency location of the control channel related to the current state of the receiver according to the current state of the receiver, for example, having initiated random access after cell searching, waiting for random access ACK, having accessed a system to enter a Radio Resource Control (RRC)_IDLE state after random access has been completed and having initiated a service to enter an RRC_CONNECTED state, and further according to an ID allocated by the corresponding system in the current state, for example, a Random Access-Radio Network Temporary Identity (RA-RNTI), a Temporary Cell-Radio Network Temporary Identity (TC-RNTI) and a Cell-Radio Network Temporary Identity (C-RNTI), that is, the control channel related to the current state may be found according to the time-frequency location, the sender indicates the data time-frequency location of the data to be transmitted to the receiver through control information, and the sender may further send other information through the control channel, for example, the size of the time-frequency resource occupied by the data, the MCS of the data and information related to a HARQ, for example, Redundancy Version (RV) information.

Therefore, according to the method for radio resource allocation of the embodiments of the disclosure, the sender determines the time-frequency location of the control channel related to the current state of the receiver according to the ID of the receiver in the current state, and indicates the time-frequency location of the data to be transmitted to the receiver through the control channel, so that the control channel used by the sender and the receiver may be flexibly allocated as desired, and efficiency, performance and applicability of a wireless communication system are improved.

In S110, the sender determines the channel time-frequency location of the control channel related to the current state of the receiver according to the ID of the receiver in the current state. Specifically, when the receiver is in one of multiple states, a corresponding system may allocate a ID different from that in another state. For example, if the receiver is a terminal device, i.e. User Equipment (UE), in a random access process, the ID allocated to this terminal may be the RA-RNTI or the TC-RNTI. For another example, if the terminal has accessed the system and is in the RRC_IDLE state, the ID allocated to the terminal may be the C-RNTI. Alternatively, the receiver may be in a state of having initiated random access after cell searching, waiting for random access ACK, having accessed the system to enter the RRC_IDLE state after random access has been completed and having initiated the service to enter the RRC_CONNECTED state. The ID allocated to the receiver by the system may be the RA-RNTI, the TC-RNTI, the C-RNTI and the like, which will not form limits to the disclosure.

Alternatively, the sender may further determine the channel time-frequency location according to the ID of the receiver in combination with other information, for example, in combination with cell level information. The cell level information may be an Evolved Cell Global Identifier (ECGI), an Evolved Node B (eNB) ID & Cell ID (ECI), a System Information-Radio Network Temporary Identity (SI-RNTI), a Paging-Radio Network Temporary Identity (P-RNTI) and the like.

Figure 2:
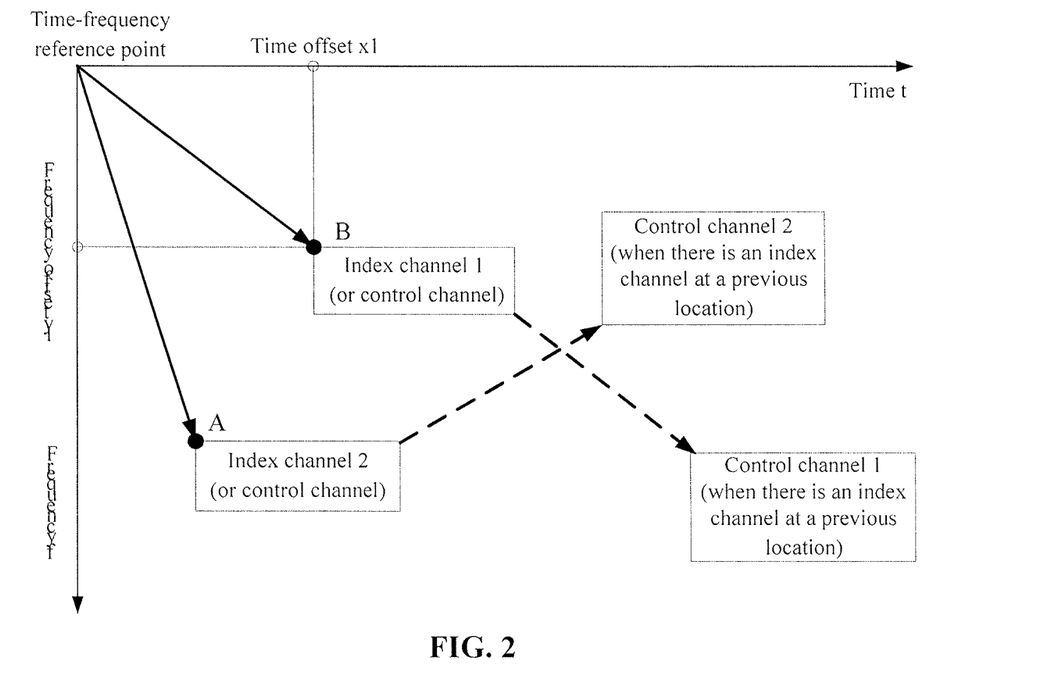
FIG. 2 illustrates a schematic diagram of a time-frequency location in a method for radio resource allocation according to embodiments of the disclosure.

In the embodiments of the disclosure, the sender may determine the channel time-frequency location of the control channel of the receiver according to the ID of the receiver in the current state or in combination with the other information, for example, the cell level information. The channel time-frequency location may be a location relative to a certain time-frequency reference point, and for example, as illustrated in FIG. 2, the channel time-frequency location may include a time offset and frequency offset relative to the time-frequency reference point. For example, the channel time-frequency location may be location A and location B in FIG. 2. Specifically, after determining the ID of the receiver in the current state, the sender may determine the channel time-frequency location relative to a certain time-frequency reference point under the preset rule. The preset rule may be a hash function, for example, a Message Digest 5 (MD5) hash function, or may be a modular function, or may be another function, which is used to process the ID of the receiver, or perform a merging operation on the ID of the receiver and a sequence related to another cell, thereby obtaining the channel time-frequency location relative to the time-frequency reference point.

Alternatively, in some embodiments, for example, a UE ID of a certain terminal is 0x36ED (a 16-bit number), and in combination with cell level information, for example, an ECI of a cell is a 28 bit number 0x13432A01, the preset rule may be determining a time-frequency location according to the MD5 hash function. Specifically, an Exclusive Or (XoR) operation is performed on the UE ID and the ECI of the cell to obtain a number "0x1343 ICEC", and an MD5 hash function checksum of such a hexadecimal number is "692b3803ead63124a96d618bc62b7513". One method is to clip two 2-digit hexadecimal numbers at any specified location and perform modulo-10 and modulo-50 operations. For example, the modulo-10 operation may be performed on first 2 digits "0x69", i.e. denary 105, under the preset rule to obtain a time offset t=5, and the modulo-50 operation is performed on last 2 digits "0x13", i.e. denary 19, to obtain a frequency offset f=19, to obtain a time-frequency offset (t,f)=(5,19), i.e. the channel time-frequency location, corresponding to a control channel of the terminal. Alternatively, the sender may further determine the channel time-frequency location under another preset rule, for example, another hash function or modular function, according to the ID of the receiver, which will not form limits to the disclosure.

In the embodiments of the disclosure, the sender determines the channel time-frequency location under the preset rule according to the ID of the receiver or in combination with the other information, and the time-frequency location should be in a resource allocated by a cell where the receiver is located (in the D2D direct communication scenario, the time-frequency location should be in a resource negotiated by two communication parties). For example, if a duration of a radio frame of a certain system is 10 ms and is divided into 10 subframes with lengths of 1 ms, and a carrier bandwidth is 10 MHz, and is divided, except guard bands at two ends, into 50 radio Resource Blocks (RBs) with sizes of 180 KHz, a value of a time component t in the time-frequency offset should be 0-9, a frequency component f should be 0-49, and then a value range of the channel time-frequency location is $(0,0) \le (t,f) \le (9,49)$.

In the embodiments of the disclosure, the sender determines the channel time-frequency location of the control channel under the preset rule according to the ID of the receiver or in combination with the other information, the preset rule may be preset in the sender, the preset rule may be sent to the receiver in multiple manners, and then the receiver may also determine the corresponding time-frequency location under the preset rule, thereby determining the control channel of the receiver. Specifically, for example, a sender base station may use a common channel, i.e. a broadcast channel of the base station; or in the D2D direct communication scenario, a sender terminal may use a common channel, for example, a discovery channel of the sender terminal, the sender notifies all receivers, i.e. terminals, and each terminal receives the same preset rule. Alternatively, the base station may notify certain one or more terminals through a dedicated message effective only to the one or more terminals, for example, a random access response message and an RRC connection establishment response message, and different terminals may use different preset rules to determine time-frequency locations; or in the D2D direct communication scenario, the sender terminal may signal to one or more selected receiving terminals to enable different receivers to use different preset rules, which will not form limits to the embodiments of the disclosure.

Alternatively, the sender may further change the ID of the receiver or change the preset rule for calculating the time-frequency location through the ID, and notifies the receiver by signaling and the like; or the receiver may also change own ID and notify the sender through random access, a UL scheduling request or another message, and the corresponding calculated time-frequency location may be modified at a next effective location.

In the embodiments of the disclosure, the sender may further determine the channel time-frequency location of the control channel according to the ID of the receiver in the current state or in combination with the other information. Alternatively, as illustrated in FIG. 2, the sender may directly determine the channel time-frequency location of the control channel according to a time-frequency location including a time offset and frequency offset relative to a certain time-frequency reference point, i.e. location A and location B in FIG. 2. Alternatively, a location of an index channel may also be directly determined according to the time offset and the frequency offset, that is, location A and location B illustrated in FIG. 2 are index channels, and then a location indicated by index information is determined to be the channel time-frequency location of the control channel according to the index information of the index channel, which will not form limits to the embodiments of the disclosure.

In the embodiments of the disclosure, the channel time-frequency location is determined through the ID or in combination with the other information. Alternatively, the location of the control channel may be directly determined, or the location of the index channel may be determined at first, and the index channel or the control channel may monopolize time-frequency resources at the location. For example, the time-frequency resources at the location may be directly used if having not been allocated, and if having been allocated to a data channel, may be used in a manner of puncturing in the data channel, the time-frequency resources may also be shared with another channel (for example, a downlink data channel), and the time-frequency resources are shared in a code division, space division (beamforming or using a certain spatial data stream, codeword or data layer) or after-superposition interference cancellation manner, which will not form limits to the disclosure.

In S120, the sender sends the data time-frequency location indication information indicating the data time-frequency location of the data to be sent to the receiver, the size of the time-frequency resource occupied by the data and the MCS of the data to the receiver through the control channel at the channel time-frequency location. Alternatively, the sender may further send information related to a HARQ, for example, RV information, to the receiver through the control channel, which will not form limits to the embodiments of the disclosure.

Alternatively, when the sender determines the time-frequency location of the control channel or index channel of the receiver, if the sender determines that at least two receivers have the same channel time-frequency location, control channels or index channels of the at least two receivers may share the same channel time-frequency location to send information in a code division multiplexing manner, or a spatial multiplexing manner, for example, beamforming, or by using different spatial data streams or data layers, for example, using different codebook-based pre-coded codewords, to distinguish the terminals at different spatial locations, or in a manner that the sender directly superposes signals for different receivers for interference cancellation at the receivers, which will not form limits to the embodiments of the disclosure.

In the embodiments of the disclosure, the sender determines the channel time-frequency location under the preset rule and according to the ID of the receiver, and determines the data time-frequency location where the transmitted data is located according to the control channel at the channel time-frequency location, the two time-frequency locations may be absolute time-frequency locations, the absolute time-frequency locations may be called as PRUs, or may be logical resources after time-frequency resources which will not be allocated (for example, resources configured for common channels, or resources which will not be used for reasons of avoiding interference with an adjacent cell and the like), and the logical resources may be called as VRUs. There is a specific mapping relationship between PRUs and VRUs in one or more cells (a time-frequency resource pool of a sending party in the D2D direct communication scenario), and this mapping relationship may be consistent for all terminals in the cell(s), or may be inconsistent or partially consistent. For the part consistent for all the terminals in the cell(s), a base station of the sending party (i.e. a terminal of the sending party in the D2D direct communication scenario) may use a common channel to notify all receivers, i.e. terminals. Alternatively, under the condition of inconsistency for different terminals, the base station (i.e. the terminal of the sending party in the D2D direct communication scenario) may notify one or more terminals through a dedicated message (for example, a random access response and an RRC connection establishment response) only effective to the one or more terminals, which will not form limits to the embodiments of the disclosure.

In the embodiments of the disclosure, both the channel time-frequency location indicating the location of the control channel and the data time-frequency location indicating the location of the data may have two cases, i.e., PRU and VRU. The base station of the sending party (or the terminal of the sending party in the D2D direct communication scenario) notifies the specific mode a receiving party may use through a common message or a dedicated message. When VRUs are used for the two time-frequency locations, the sender may determine a VRU corresponding to a PRU according to a mapping relationship between PRUs and VRUs, and sends the VRU to the receiving party, and the receiving party may deduce exact physical time-frequency locations according to the mapping relationship between the PRUs and the VRUs and perform reception.

Figure 3:
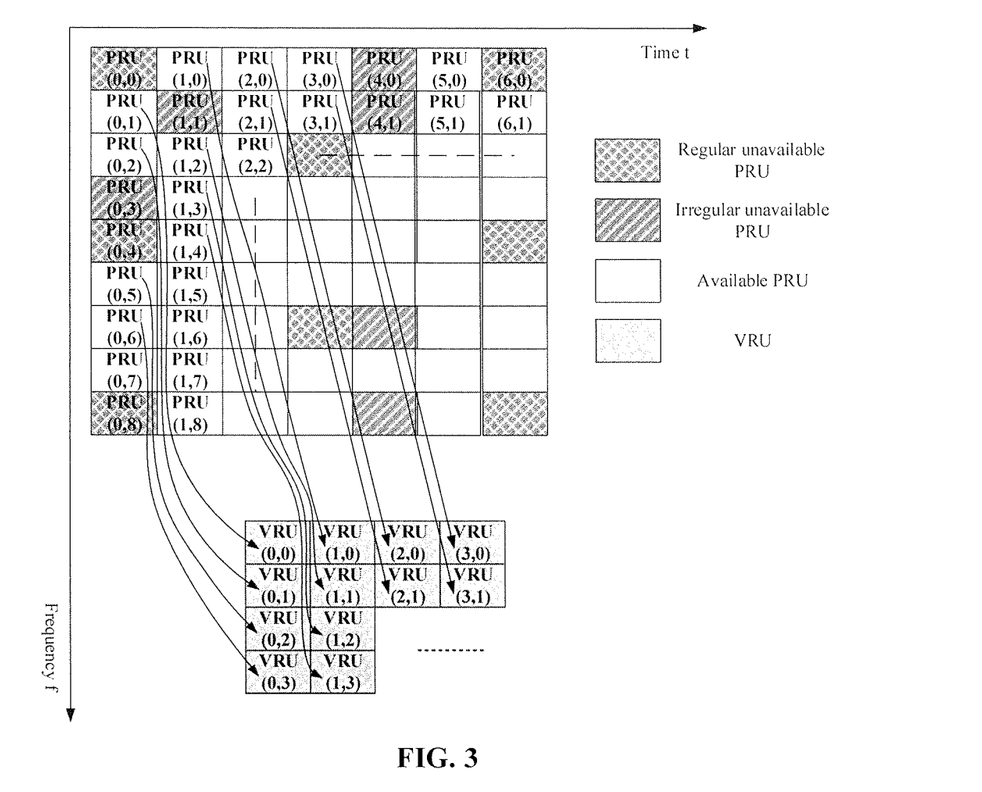
FIG. 3 illustrates a schematic diagram of a mapping relationship between a PRU and a VRU according to embodiments of the disclosure.

Specifically, the mapping relationship between the PRUs and the VRUs may be illustrated in FIG. 3. The base station of the sending party (or the terminal of the sending party in the D2D direct communication scenario) may use multiple methods to indicate this mapping relationship. For example, serial numbers of PRUs which will not be/will be mapped are sent in a certain manner, and a specific manner is as follows.

I: frequency after time: PRUs (0,0), (0,3), (0,4) . . . .
ii: time after frequency: PRUs (0,0), (4,0), (6,0) . . . .
iii: regular and irregular PRUs are sent respectively, the regular PRUs may be coded (for example, only the first PRU location, a frequency interval, a time interval, the number of the regular PRUs and the like may be transmitted, and it is unnecessary to transmit the location of each PRU) to reduce transmission overhead. As illustrated in FIG. 3, the regular PRUs mentioned here are PRUs sent at a fixed time interval, and on the contrary, the irregular PRUs indicate PRUs which are sent at unfixed time intervals. In addition, transmission of the regular or irregular PRUs may alternatively are transmission of available PRUs, or may are transmission of unavailable PRUs, the specific type to be selected may be determined by judging transmission quantities of the available PRUs and the unavailable PRUs, and the available PRUs or unavailable PRUs in a smaller transmission quantity are transmitted.

iv: two-dimensional coding is performed on the PRUs in a manner of a bitmap, a compressed bitmap or the like, and the PRUs mentioned here may be available PRUs, or may be unavailable PRUs. A specific selection manner may be determined by judging the transmission quantities, which will not form limits to the embodiments of the disclosure.

Therefore, according to the method for radio resource allocation of the embodiments of the disclosure, the sender determines the time-frequency location of the control channel related to the current state of the receiver according to the ID of the receiver in the current state, and then indicates the time-frequency location of the data to be transmitted to the receiver through the control channel, so that the control channel used by the sender and the receiver may be flexibly allocated as desired, and the efficiency, performance and applicability of the wireless communication system are improved.

The method for radio resource allocation according to the embodiments of the disclosure is described above in combination with FIG. 1 to FIG. 3 in detail from the view of the sender, and method for radio resource allocation according to the embodiments of the disclosure will be described below in combination with FIG. 4 in detail from the view of the receiver.

Figure 4:
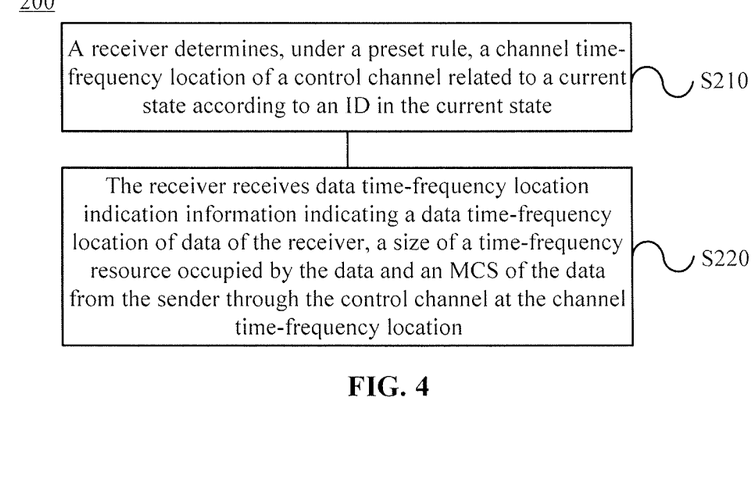
FIG. 4 illustrates another schematic flowchart of A method for radio resource allocation according to embodiments of the disclosure.

FIG. 4 illustrates a schematic flowchart of a method for radio resource allocation 200 according to embodiments of the disclosure. The method 200 may be executed by a receiver, and the receiver may be a user equipment, for example, UE. As illustrated in FIG. 4, the method 200 includes the following operations.

In S210, the receiver determines a channel time-frequency location of a control channel related to a current state according to an ID in the current state and according to a preset rule.

In S220, the receiver receives data time-frequency location indication information indicating a data time-frequency location of data to be received by the receiver, a size of a time-frequency resource occupied by the data and a MCS of the data from the sender through the control channel at the channel time-frequency location.

Therefore, according to the method for radio resource allocation of the embodiments of the disclosure, the receiver determines the time-frequency location of the control channel related to the current state of the receiver according to the ID in the current state, and then determines the time-frequency location of the data transmitted to the receiver by the sender through the control channel, so that the control channel used by the sender and the receiver may be flexibly allocated as desired, and efficiency, performance and applicability of a wireless communication system are improved.

In S210, the receiver determines the channel time-frequency location of the control channel related to the current state under the preset rule according to the ID in the current state. Specifically, when the receiver is in one of multiple possible states, a corresponding system may allocate an ID from that in another state. For example, if the receiver is a terminal device, i.e. UE, in a random access process, the ID allocated to this terminal may be an RA-RNTI or a TC-RNTI. For another example, if the terminal has accessed the system and is in an RRC_IDLE state, the ID allocated to the terminal may be a C-RNTI. Alternatively, the receiver may be in a state of having initiated random access after cell searching, waiting for random access ACK, having accessed the system to enter the RRC_IDLE state after random access has been completed and having initiated a service to enter an RRC_CONNECTED state. The ID allocated to the receiver by the system may be the RA-RNTI, the TC-RNTI, the C-RNTI and the like, which will not form limits to the disclosure.

Alternatively, the receiver may further determine the channel time-frequency location according to own ID in combination with other information, for example, in combination with cell level information. Specifically, the cell level information may be an ECGI, an ECI, an SI-RNTI, a P-RNTI and the like.

In the embodiments of the disclosure, the receiver may determine the channel time-frequency location of the control channel of the receiver according to the ID in the current state or in combination with the other information. The channel time-frequency location may be a location relative to a certain time-frequency reference point, and for example, as illustrated in FIG. 2, the channel time-frequency location may include a time offset and frequency offset relative to the time-frequency reference point. For example, the channel time-frequency location may be location A and location B in FIG. 2. Specifically, after determining own ID in the current state, the receiver may determine the channel time-frequency location relative to a certain time-frequency reference point under the preset rule. The preset rule may be a hash function, for example, an MD5 hash function, or may be a modular function, or may further be another function, which is used to process the ID of the receiver, or perform a merging operation on the ID of the receiver and a sequence related to another cell, thereby obtaining the channel time-frequency location relative to the time-frequency reference point.

Alternatively, in some embodiments, the channel time-frequency location is determined according to the ID of the receiver. For example, a UE ID of a terminal is 0x36ED (16 bit number), and the preset rule may be determining a time-frequency location according to the MD5 hash function. Specifically, an MD5 hash function checksum of a character string "36ED" is "a7be1684049bb84bda24ae53b90c0348". One method is to clip two 2-digit hexadecimal numbers at any specified locations and perform modulo-10 and modulo-50 operations. For example, the modulo-10 operation may be performed on first 2 digits "0xa7", i.e. denary 167, under the preset rule to obtain a time offset t=7, and the modulo-50 operation is performed on last 2 digits "0x48", i.e. denary 72, to obtain a frequency offset f=22, to obtain a time-frequency offset (t,f)=(7,22), i.e. the channel time-frequency location, corresponding to a control channel of the terminal. Alternatively, the receiver may determine the channel time-frequency location under another preset rule, for example, another hash function or modular function, and according to the ID, the preset rule may be preset in the receiver, and the preset rule may also be sent to the receiver through the sender, which will not form limits to the disclosure.

Specifically, the receiver may further determine the channel time-frequency location of the control channel under the preset rule and according to the ID or in combination with the other information, the preset rule may be preset in the receiver, and the preset rule may also be sent to the receiver by the sender in multiple manners. Specifically, for example, a sender base station may use a common channel, i.e. a broadcast channel of the base station; or in a D2D direct communication scenario, a sender terminal may also use a common channel, for example, a discovery channel of the sender terminal, the sender notifies all receivers, i.e. terminals, and each terminal receives the same preset rule. Alternatively, the base station may notify certain one or more terminals through a dedicated message effective only to the one or more terminals, for example, a random access response message and an RRC connection establishment response message, and different terminals may use different preset rules to determine time-frequency locations; or in the D2D direct communication scenario, the sender terminal may also transmit signaling to one or more selected receiving terminals to enable different receivers to use different preset rules, which will not form limits to the embodiments of the disclosure.

Alternatively, the sender may further change the ID of the receiver or change the preset rule for calculating the time-frequency location through the ID, and notifies the receiver by signaling and the like; or the receiver may also change own ID and notify the sender through random access, a UL scheduling request or another message, and the corresponding calculated time-frequency location may be modified at a next effective location.

In the embodiments of the disclosure, the time-frequency location determined by the receiver under the preset rule and according to the ID or in combination with the other information should be in a resource allocated by a cell where the receiver is located (in the D2D direct communication scenario, the time-frequency location should be in a resource negotiated by two communication parties). For example, if a duration of a radio frame of a certain system is 10 ms and is divided into 10 subframes with lengths of 1 ms, and a carrier bandwidth is 10 MHz, and is divided, except guard bands at two ends, into 50 radio RBs with sizes of 180 KHz, a value of a time component t in the time-frequency offset should be 0-9, a frequency component f should be 0-49, and then a value range of the channel time-frequency location is $(0,0) \leq (t,f) \leq (9,49)$.

In the embodiments of the disclosure, the receiver determines the channel time-frequency location of the control channel according to the ID in the current state. Alternatively, as illustrated in FIG. 2, the receiver may directly determine the channel time-frequency location of the control channel according to a time-frequency location including a time offset and frequency offset relative to a certain time-frequency reference point, i.e. location A and location B in FIG. 2. Alternatively, a location of an index channel may also be directly determined according to the time offset and the frequency offset, that is, location A and location B illustrated in FIG. 2 are index channels, and then a location indicated by index information is determined to be the channel time-frequency location of the control channel according to the index information of the index channel, which will not form limits to the embodiments of the disclosure.

In the embodiments of the disclosure, the receiver may further determine the channel time-frequency location according to the ID in the current state or in combination with the other information. Alternatively, there may be a situation that multiple receivers may determine the same location, that is, the multiple receivers determine the same time offset and frequency offset and determine that locations of the control channel are the same location, and then these receivers determining the same result may retrieve the control channel at the time-frequency location or the control channel indicated by the index channel and further judge the receiver to which the control channel belongs. Specifically, ID information of the terminal may be included in the control channel, and the receivers may determine which the specific receiver to which the control channel corresponds according to the ID information. For any receiver in these receivers determining the same time-frequency location, if there is no information corresponding to the receiver at the time-frequency location, the receiver may enter a sleep state, until the receiver may perform retrieval again at a next time-frequency location (for example, a corresponding location of a next radio frame), and at this time, the receiver may determine that a control channel is a control channel corresponding to the receiver after the receiver retrieves its own corresponding ID information in the control channel.

Alternatively, when the receiver determines the channel time-frequency location according to the ID information or in combination with the other information and ID information of another receiver is further included in the control channel at the time-frequency location, that is, multiple receivers determine the same time-frequency location, these receivers may further share a corresponding channel time-frequency resource, a code division multiplexing manner or a spatial multiplexing manner, for example, beamforming, may be adopted, or terminals at different spatial locations are distinguished by using spatial data streams or data layers, for example, using different pre-coded codewords, or in the case that the sender directly superposes signals for different receivers, the receivers may perform interference cancellation, and in any of these manners, a receivers may determine a control channel corresponding to the receiver and acquire information in the control channel.

In S220, the receiver receives the data time-frequency location indication information indicating the data time-frequency location of data to be sent to the receiver, the size of the time-frequency resource occupied by the data and the MCS of the data from the sender through the corresponding control channel at the determined channel time-frequency location. Alternatively, the receiver may further receive information related to a HARQ for a transmission data block, for example, RV information, through the control channel, which will not form limits to the embodiments of the disclosure.

In the embodiments of the disclosure, the receiver determines the channel time-frequency location under the preset rule according to the ID or in combination with the other information, and determines the data time-frequency location of the transmitted data according to the control channel at the channel time-frequency location, the two time-frequency locations may be absolute time-frequency locations, the absolute time-frequency locations may be called as PRUs, or may be logical resources after time-frequency resources which will not be allocated (for example, resources configured for common channels, or resources which will not be used for reasons of avoiding interference with an adjacent cell and the like), and the logical resources may be called as VRUs. There is a specific mapping relationship between PRUs and VRUs in one or more cells (a time-frequency resource pool of a sending party in the D2D direct communication scenario), and this mapping relationship may be consistent for all terminals in the cell(s), or may be inconsistent or partially consistent. For the part consistent for all the terminals in the cell(s), a sender base station (i.e. a terminal of the sending party in the D2D direct communication scenario) may use a common channel to notify all receivers, i.e. terminals. Alternatively, in the case of inconsistency for different terminals, the base station (i.e. the terminal of the sending party in the D2D direct communication scenario) may notify one or more terminals through a dedicated message, for example, a random access response and an RRC connection establishment response, only effective to the one or more terminals, which will not form limits to the embodiments of the disclosure.

In the embodiments of the disclosure, both the channel time-frequency location indicating the location of the control channel and the data time-frequency location indicating the location of the data may have two cases, i.e., PRU and VRU. The base station of the sending party (or the terminal of the sending party in the D2D direct communication scenario) notifies the specific mode a receiving party may specifically use through a common message or a dedicated message. When VRUs are used for the two time-frequency locations, the receiver may deduce an exact physical time-frequency location according to a mapping relationship between PRUs and VRUs and perform reception.

Specifically, the mapping relationship between the PRUs and the VRUs may be illustrated in FIG. 3. The sender base station (or the terminal of the sending party in the D2D direct communication scenario) may use multiple methods to indicate this mapping relationship. For example, numbers of PRUs which will (or will not) be mapped are sent according to a certain manner. For the receiver, the specific time-frequency location may be determined according to the received numbers of the PRUs which will (or will not) be mapped. Specifically, the operation that the sender send the serial numbers of the PRUs which will (or will not) be mapped may be seen from the abovementioned sending embodiment, and will not be elaborated herein.

It should be understood that, in each embodiment of the disclosure, a magnitude of a sequence number of each process does not mean an execution sequence, and the execution sequence of each process should be determined according to its function and an internal logic, and should not form any limit to an implementation process of the embodiments of the disclosure.

Therefore, according to the method for radio resource allocation of the embodiments of the disclosure, the receiver determines the time-frequency location of the control channel related to the current state of the receiver according to the ID in the current state, and indicates the time-frequency location of the data to be transmitted to the receiver through the control channel, so that the control channel used by the sender and the receiver may be flexibly allocated as desired, and the efficiency, performance and applicability of the wireless communication system are improved.

The method for radio resource allocation according to the embodiments of the disclosure is described above in combination with FIG. 1 to FIG. 4 in detail, and a radio resource allocation device according to the embodiments of the disclosure will be described below in combination with FIG. 5 to FIG. 6.

Figure 5:
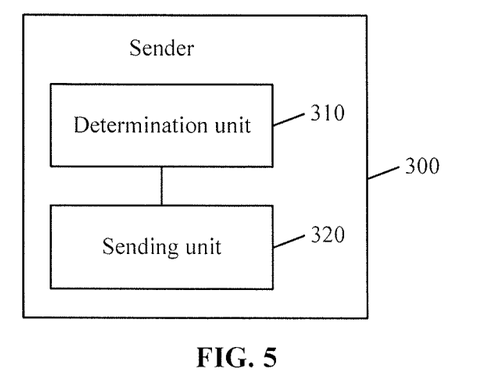
FIG. 5 illustrates a schematic block diagram of a radio resource allocation sender according to embodiments of the disclosure.

As illustrated in FIG. 5, a radio resource allocation sender 300 according to embodiments of the disclosure includes a determination unit 310 and a sending unit 320.

The determination unit 310 may be configured to determine, under a preset rule, a channel time-frequency location of a control channel related to a current state of a receiver according to an Identifier (ID) of the receiver in the current state.

The sending unit 320 may be configured to send data time-frequency location indication information indicating a data time-frequency location of data to be sent to the receiver, a size of a time-frequency resource occupied by the data and a Modulation and Coding Scheme (MCS) of the data to the receiver through the control channel at the channel time-frequency location.

Therefore, according to the radio resource allocation sender of the embodiments of the disclosure, the sender determines the time-frequency location of the control channel related to the current state of the receiver according to the ID of the receiver in the current state, and indicates the time-frequency location of the data to be transmitted to the receiver through the control channel, so that the control channel used by the sender and the receiver may be flexibly allocated as desired, and efficiency, performance and applicability of a wireless communication system are improved.

Alternatively, the determination unit 310 is specifically configured to determine the channel time-frequency location under the preset rule according to the ID in the current state and cell level information.

Alternatively, the sending unit 320 is further configured to send the preset rule to the receiver.

Alternatively, the determination unit 310 is specifically configured to determine the channel time-frequency location through a hash function or a modular function according to the ID of the receiver in the current state.

Alternatively, the determination unit 310 is specifically configured to determine, under the preset rule, a time-frequency location of an index channel of the receiver according to the ID of the receiver; and determine the channel time-frequency location of the control channel of the receiver according to a location indicated by the index channel.

Alternatively, the sending unit 320 is further configured to, when the sender determines that at least two receivers have the same channel time-frequency location, simultaneously send information in control channels corresponding to the at least two receivers at the same channel time-frequency location in a code division multiplexing manner, or a spatial multiplexing manner or an after-superposition interference cancellation manner.

Alternatively, the channel time-frequency location includes a time offset and frequency offset relative to a time-frequency reference point.

Alternatively, the channel time-frequency location is a PRU location or a VRU location; and the data time-frequency location is a PRU location or a VRU location.

Alternatively, the sending unit 320 is further configured to send information related to a HARQ for the data to the receiver through the control channel.

It should be understood that the radio resource allocation sender 300 according to the embodiments of the disclosure may correspondingly execute the method 100 in the embodiments of the disclosure, and the abovementioned and other operations and/or functions of each unit in the radio resource allocation sender 300 are adopted to implement corresponding flows of each method in FIG. 1, and for simplicity, will not be elaborated herein.

Therefore, according to the radio resource allocation sender of the embodiments of the disclosure, the sender determines the time-frequency location of the control channel related to the current state of the receiver according to the ID of the receiver in the current state, and indicates the time-frequency location of the data to be transmitted to the receiver through the control channel, so that the control channel used by the sender and the receiver may be flexibly allocated as desired, and the efficiency, performance and applicability of the wireless communication system are improved.

Figure 6:
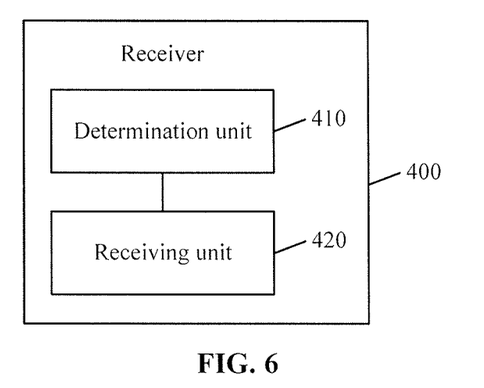
FIG. 6 illustrates a schematic block diagram of a radio resource allocation receiver according to embodiments of the disclosure.

As illustrated in FIG. 6, a radio resource allocation receiver 400 according to embodiments of the disclosure includes a a determination unit 410 and a receiving unit 420.

The determination unit 410 may be configured to determine a channel time-frequency location of a control channel related to a current state according to an ID in the current state and according to a preset rule.

The receiving unit 420 may be configured to receive data time-frequency location indication information indicating a data time-frequency location of data of the receiver, a size of a time-frequency resource occupied by the data and a Modulation and Coding Scheme (MCS) of the data from the sender through the control channel at the channel time-frequency location.

Therefore, the radio resource allocation receiver of the embodiments of the disclosure determines the time-frequency location of the control channel related to the current state of the receiver according to the ID in the current state, and indicates the time-frequency location of the data to be transmitted to the receiver through the control channel, so that a control channel used by the sender and the receiver may be flexibly allocated as desired, and efficiency, performance and applicability of a wireless communication system are improved.

Alternatively, the determination unit 410 is specifically configured to determine the channel time-frequency location of the control channel according to the ID and cell level information.

Alternatively, the receiving unit 420 is further configured to receive the preset rule sent by the sender.

Alternatively, the determination unit 410 is specifically configured to determine the channel time-frequency location through a hash function or a modular function according to the ID.

Alternatively, the determination unit 410 is specifically configured to determine, under the preset rule, a time-frequency location of an index channel according to the ID, and determine the channel time-frequency location of the control channel according to a location indicated by the index channel.

Alternatively, the receiving unit 420 is specifically configured to, when the control channel at the channel time-frequency location includes the ID of the receiver, determine the data time-frequency location indication information, the size of the time-frequency resource occupied by the data and the MCS of the data according to information in the control channel; and when the control channel at the channel time-frequency location does not include the ID of the receiver, enter a sleep state, and when a control channel at a next channel time-frequency location includes the ID of the receiver, determine the data time-frequency location indication information, size of the time-frequency resource occupied by the data and MCS of the data sent by the sender according to information in the control channel at the next channel time-frequency location.

Alternatively, the receiving unit 420 is specifically configured to, when the control channel at the channel time-frequency location includes the ID of the receiver and an ID of another receiver, acquire the information in the control channel corresponding to the receiver, and determine the data time-frequency location indication information, the size of the time-frequency resource occupied by the data and the MCS of the data in a code division multiplexing manner, or a spatial multiplexing manner or an interference cancellation manner.

Alternatively, the channel time-frequency location is a PRU location or a VRU location; and the data time-frequency location is a PRU location or a VRU location.

Alternatively, the determination unit 410 is specifically configured to, when the channel time-frequency location is a VRU location, determine a PRU location of the control channel according to a mapping relationship between a VRU and a PRU; and when the data time-frequency location is a VRU location, determine a PRU location of the data sent by the sender according to the mapping relationship between the VRU and the PRU.

Alternatively, the receiving unit 420 is further configured to receive information related to a HARQ for the data sent by the sender through the control channel.

It should be understood that the radio resource allocation receiver 400 according to the embodiments of the disclosure may correspondingly execute the method 200 in the embodiments of the disclosure, and the abovementioned and other operations and/or functions of each unit in the radio resource allocation receiver 400 are adopted to implement corresponding flows of each method in FIG. 4, and for simplicity, will not be elaborated herein.

Therefore, the radio resource allocation receiver of the embodiments of the disclosure determines the time-frequency location of the control channel related to the current state of the receiver according to the ID in the current state, and indicates the time-frequency location of the data to be transmitted to the receiver through the control channel, so that the control channel used by the sender and the receiver may be flexibly allocated as desired, and the efficiency, performance and applicability of the wireless communication system are improved.

Those skilled in the art may realize that the units and algorithm operations of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Those skilled in the art may realize the described functions for each specific application by virtue of different methods, but such realization shall fall within the scope of the disclosure.

Those skilled in the art may clearly learn about that specific working processes of the system, device and unit described above may refer to the corresponding processes in the method embodiments for convenient and brief description and will not be elaborated herein.

In some embodiments provided by the disclosure, it should be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each function unit in each embodiment of the disclosure may be integrated into a processing unit, each unit may also exist independently, and two or more than two unit may also be integrated into a unit.

When being implemented in form of software function unit and sold or used as an independent product, the function may also be stored in a computer-readable storage medium. Based on such an understanding, the technical solutions of the disclosure substantially or parts making contributions to a conventional art or part of the technical solutions may be embodied in form of software product, and the computer software product is stored in a storage medium, including a plurality of instructions configured to enable a piece of computer equipment (which may be a personal computer, a server, network equipment or the like) to execute all or part of the operations of the method in each embodiment of the disclosure. The abovementioned storage medium includes: various media capable of storing program codes such as a U disk, a mobile hard disk, a Read-Only Memory (ROM), a Random Access Memory (RAM), a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A method for radio resource allocation, comprising:
   determining, by a sender, a location of an index channel according to a time offset and frequency offset, wherein the time offset is a time offset relative to a certain time-frequency reference point and the frequency offset is a frequency offset relative to the certain time-frequency reference point;
   determining, by the sender, a channel time-frequency location of a control channel related to a current state of a receiver according to the index channel, wherein the index channel is a channel different from the control channel; and
   sending, by the sender, data time-frequency location indication information indicating a data time-frequency location of data to be sent to the receiver, a size of a time-frequency resource occupied by the data and a Modulation and Coding Scheme (MCS) of the data to the receiver through the control channel at the channel time-frequency location.

2. The method according to claim 1, wherein determining, by the sender, the channel time-frequency location of the control channel related to the current state of the receiver according to the index channel comprises:
   determining, by the sender, a location indicated by index information of the index channel to be the channel time-frequency location of the control channel.

3. The method according to claim 1, wherein determining, by the sender, the channel time-frequency location of the control channel related to the current state of the receiver according to the index channel comprises:
   determining, by the sender, the channel time-frequency location of the control channel related to the current state of the receiver according to an Identifier, ID, of the receiver in the current state in combination with the index channel.

4. The method according to claim 1, further comprising:
   sending, by the sender, information related to a Hybrid Automatic Repeat Request (HARQ) for the data to the receiver through the control channel.

5. A method for radio resource allocation, comprising:

determining, by a receiver, a location of an index channel according to a time offset and frequency offset, wherein the time offset is a time offset relative to a certain time-frequency reference point and the frequency offset is a frequency offset relative to the certain time-frequency reference point;

determining, by the receiver, a channel time-frequency location of a control channel related to a current state according to the index channel, wherein the index channel is a channel different from the control channel; and receiving, by the receiver, data time-frequency location indication information indicating a data time-frequency location of data of the receiver, a size of a time-frequency resource occupied by the data and a Modulation and Coding Scheme (MCS) of the data from the sender through the control channel at the channel time-frequency location.

6. The method according to claim 5, wherein determining, by the receiver, the channel time-frequency location of the control channel related to the current state according to the index channel comprises:

determining, by the receiver, a location indicated by index information of the index channel to be the channel time-frequency location of the control channel.

7. The method according to claim 5, wherein determining, by the receiver, the channel time-frequency location of the control channel related to the current state according to the index channel comprises:

determining, by the receiver, the channel time-frequency location of the control channel related to the current state according to an Identifier, ID, of the receiver in the current state in combination with the index channel.

8. The method according to claim 5, further comprising:

receiving, by the receiver, information related to a Hybrid Automatic Repeat Request (HARQ) for the data sent by the sender through the control channel.

9. A radio resource allocation receiver, comprising:

a processor, configured to determine a location of an index channel according to a time offset and frequency offset and determine a channel time-frequency location of a control channel related to a current state according to the index channel, wherein the time offset is a time offset relative to a certain time-frequency reference point and the frequency offset is a frequency offset relative to the certain time-frequency reference point and the index channel is a channel different from the control channel; and a receiver, configured to receive data time-frequency location indication information indicating a data time-frequency location of data of the receiver, a size of a time-frequency resource occupied by the data and a Modulation and Coding Scheme (MCS) of the data from the sender through the control channel at the channel time-frequency location.

10. The receiver according to claim 9, wherein the processor is further configured to determine a location indicated by index information of the index channel to be the channel time-frequency location of the control channel.

11. The receiver according to claim 9, wherein the processor is further configured to determine the channel time-frequency location of the control channel related to the current state of the receiver according to an Identifier, ID, of the receiver in the current state in combination with the index channel.

12. The receiver according to claim 9, wherein the receiver is further configured to receive information related to a Hybrid Automatic Repeat Request (HARQ) for the data sent by the sender through the control channel.

* * * * *